United States Patent
Grocutt et al.

(10) Patent No.: US 11,188,330 B2
(45) Date of Patent: Nov. 30, 2021

(54) VECTOR MULTIPLY-ADD INSTRUCTION

(71) Applicant: ARM LIMITED, Cambridge (GB)

(72) Inventors: Thomas Christopher Grocutt, Cambridge (GB); François Christopher Jacques Botman, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/324,239

(22) PCT Filed: Aug. 14, 2017

(86) PCT No.: PCT/GB2017/052386
§ 371 (c)(1),
(2) Date: Feb. 8, 2019

(87) PCT Pub. No.: WO2018/051057
PCT Pub. Date: Mar. 22, 2018

(65) Prior Publication Data
US 2019/0196825 A1    Jun. 27, 2019

(30) Foreign Application Priority Data
Sep. 13, 2016 (GB) .................... 1615526

(51) Int. Cl.
*G06F 9/30* (2018.01)
*G06F 15/80* (2006.01)
(Continued)

(52) U.S. Cl.
CPC ........ *G06F 9/30036* (2013.01); *G06F 7/5443* (2013.01); *G06F 15/8076* (2013.01); *G06F 17/16* (2013.01)

(58) Field of Classification Search
None
See application file for complete search history.

(56) References Cited

U.S. PATENT DOCUMENTS

| 4,974,198 A | 11/1990 | Ishii |
| 5,081,573 A | 1/1992 | Hall et al. |

(Continued)

FOREIGN PATENT DOCUMENTS

| JP | H4-76772 | 3/1992 |
| JP | 2001-256199 | 9/2001 |

(Continued)

OTHER PUBLICATIONS

International Search Report and Written Opinion of the ISA for PCT/GB2017/052386, dated Nov. 16, 2017, 10 pages.

(Continued)

*Primary Examiner* — Corey S Faherty
(74) *Attorney, Agent, or Firm* — Nixon & Vanderhye P.C.

(57) ABSTRACT

An apparatus comprises processing circuitry, a number of vector register and a number of scalar registers. An instruction decoder is provided which supports decoding of a vector multiply-add instruction specifying at least one vector register and at least one scalar register. In response to the vector multiply-add instruction, the decoder controls the processing circuitry to perform a vector multiply-add instruction in which each lane of processing generates a respective result data element corresponding to a sum of difference of a product value and an addend value, with the product value comprising the product of a respective data element of a first vector value and a multiplier value. In each lane of processing at least one of the multiplier value and the addend value is specified as a portion of a scalar value stored in a scalar register.

20 Claims, 11 Drawing Sheets

(51) Int. Cl.
*G06F 7/544* (2006.01)
*G06F 17/16* (2006.01)

(56) References Cited

U.S. PATENT DOCUMENTS

| | | | |
|---|---|---|---|
| 5,226,171 A | 7/1993 | Hall et al. | |
| 7,739,480 B2 * | 6/2010 | Liao | G06F 9/30014 |
| | | | 712/3 |
| 7,908,460 B2 * | 3/2011 | Liao | G06F 9/30014 |
| | | | 712/3 |
| 8,595,280 B2 * | 11/2013 | Symes | G06F 9/3887 |
| | | | 708/523 |
| 9,733,935 B2 * | 8/2017 | Corbal | G06F 9/3001 |
| 9,792,115 B2 * | 10/2017 | Corbal | G06F 9/30036 |
| 2005/0125636 A1 | 6/2005 | Ford et al. | |
| 2009/0198966 A1 | 8/2009 | Gschwind et al. | |
| 2012/0078992 A1 * | 3/2012 | Wiedemeier | G06F 7/483 |
| | | | 708/501 |
| 2013/0073838 A1 | 3/2013 | Gschwind et al. | |

FOREIGN PATENT DOCUMENTS

| | | |
|---|---|---|
| JP | 2006-39840 | 2/2006 |
| JP | 2006-171827 | 6/2006 |
| JP | 2008-83947 | 4/2008 |
| JP | 2010-539593 | 12/2010 |
| JP | 2011-96254 | 5/2011 |
| JP | 2012-505455 | 3/2012 |
| JP | 2013-543173 | 11/2013 |
| JP | 2015-194844 | 11/2015 |
| WO | 91/10194 | 7/1991 |
| WO | 2016/003740 | 1/2016 |

OTHER PUBLICATIONS

Combined Search and Examination Report for GB1615526.9, dated Feb. 21, 2017, 6 pages.
ARM® Compiler toolchain, Version 5.03, Assembler Reference. Release Jan. 31, 2013. 643 pages.
Office Action for IL Application No. 264683 dated Jul. 29, 2020, 3 pages.
Office Action for EP Application No. 17752473.3 dated Oct. 9, 2020, 9 pages.
Office Action for EP Application No. 17752473.3 dated Aug. 6, 2021, 10 pages.
Office Action for IN Application No. 201917008688 dated Aug. 19, 2021, 8 pages.
Office Action for JP Application No. 2019-512719 dated Sep. 16, 2021 and English translation, 10 pages.

* cited by examiner if $NE_{remaining} < NV$, mask last $(NV-NE_{remaining})$ lanes

| lane result L[i] | result data element | sticky bit |
|---|---|---|
| L[i] < min | Q0'[i] = min | 1 |
| min ≤ L[i] ≤ max | Q0'[i] = L[i] | previous value |
| L[i] > max | Q0'[i] = max | 1 |

VECTOR MULTIPLY-ADD INSTRUCTION

This application is the U.S. national phase of International Application No. PCT/GB2017/052386 filed 14 Aug. 2017, which designated the U.S. and claims priority to GB Patent Application No. 1615526.9 filed 13 Sep. 2016, the entire contents of each of which are hereby incorporated by reference.

The present technique relates to the field of data processing.

Some data processing systems support processing of vector instructions for which a source operand or result value of the instruction is a vector comprising multiple data elements. By supporting the processing of a number of distinct data elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

At least some examples provide an apparatus comprising:
processing circuitry to perform data processing;
a plurality of vector registers to store vector values comprising a plurality of data elements;
a plurality of scalar registers to store scalar values; and
an instruction decoder to decode a vector multiply-add instruction specifying a plurality of registers including at least one vector register and at least one scalar register, to control the processing circuitry to perform a vector multiply-add operation comprising a plurality of lanes of processing on a first vector value stored in a first vector register specified by the vector multiply-add instruction to generate a result vector value comprising a plurality of result data elements;
each lane of processing comprising generating a respective result data element of the result vector value corresponding to a sum or difference of a product value and an addend value, the product value corresponding to a product of a respective data element of the first vector value and a multiplier value;
wherein for each lane of processing, at least one of the multiplier value and the addend value comprises at least a portion of a scalar value stored in a scalar register specified by the vector multiply-add instruction.

At least some examples provide an apparatus comprising:
means for performing data processing;
a plurality of means for storing vector values comprising a plurality of data elements;
a plurality of means for storing scalar values; and
means for decoding a vector multiply-add instruction specifying at least one means for storing vector values and at least one means for storing scalar values, to control the means for performing data processing to perform a vector multiply-add operation comprising a plurality of lanes of processing on a first vector value stored in a first means for storing vector values specified by the vector multiply-add instruction to generate a result vector value comprising a plurality of result data elements;
each lane of processing comprising generating a respective result data element of the result vector value corresponding to a sum or difference of a product value and an addend value, the product value corresponding to a product of a respective data element of the first vector value and a multiplier value;
wherein for each lane of processing, at least one of the multiplier value and the addend value comprises at least a portion of a scalar value stored in a means for storing scalar values specified by the vector multiply-add instruction.

At least some examples provide a data processing method comprising:
decoding a vector multiply-add instruction specifying a plurality of registers including at least one vector register and at least one scalar register; and
in response to the vector multiply-add instruction, controlling processing circuitry to perform a vector multiply-add operation comprising a plurality of lanes of processing on a first vector value stored in a first vector register specified by the vector multiply-add instruction to generate a result vector value comprising a plurality of result data elements;
each lane of processing comprising generating a respective result data element of the result vector value corresponding to a sum or difference of a product value and an addend value, the product value corresponding to a product of a respective data element of the first vector value and a multiplier value;
wherein for each lane of processing, at least one of the multiplier value and the addend value comprises at least a portion of a scalar value stored in a scalar register specified by the vector multiply-add instruction.

At least some examples provide a virtual machine computer program comprising program instructions to control a host data processing apparatus to provide an instruction execution environment corresponding to the apparatus discussed above.

A computer-readable storage medium storing the virtual machine computer program may also be provided. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of an apparatus having processing circuitry supporting processing of vector values comprising two or more data elements;

Figure 1:
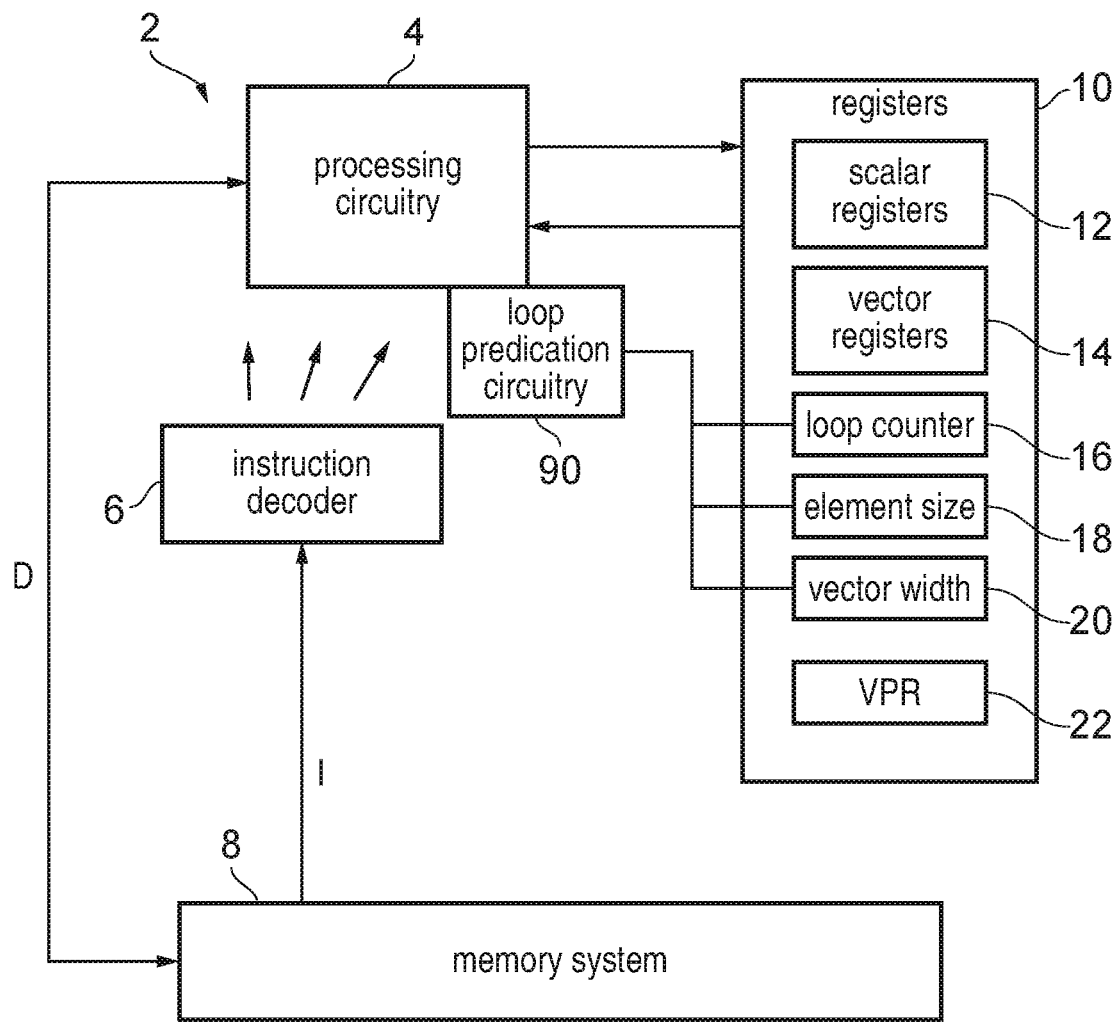

A data processing apparatus may have processing circuitry for performing data processing, a number of vector registers for storing vector values comprising multiple data elements and a number of scalar registers for storing scalar values which comprise a single data element. An instruction decoder may be provided to decode program instructions to be executed and control the processing circuitry to perform the data processing operations represented by these instructions. The instruction decoder supports a vector multiply-add instruction which specifies a plurality of registers including at least one vector register and at least one scalar register. In response to the multiply-add instruction, the instruction decoder controls the processing circuitry to perform a vector multiply-add operation which comprises multiple lanes of processing performed on a first vector value stored in a first vector register specified by the vector multiply-add instruction. The processing circuitry generates a result vector value comprising a number of result data elements, based on the outcome of the vector multiply-add operation. Each lane of processing comprises generating a respective result data element of the result vector value corresponding to the sum or difference of a product value and an addend value, with the product value corresponding to the product of a respective data element of the first vector value and a multiplier value. For each lane of processing, at least one of the multiplier value and the addend value comprises at least a portion of a scalar value that is stored in a scalar register specified by the vector multiply-add instruction.

Vector processing, where multiple lanes of processing of independent data elements represented within a single vector register are performed in response to a single instruction, has typically been used in relatively large processors, designed for performance rather than low power or circuit area. In such high-performance processors, the vector register file and vector datapath are typically relatively large in circuit area, as are the scalar register file and scalar datapath used for scalar processing. Therefore, it has not generally been practical for vector arithmetic instructions to access both the scalar register file and the vector register file directly, because the large circuit area of these blocks mean that relatively long wiring would be required to transmit data values from the scalar register file to the vector processing circuitry, and so the signal propagation delay along such wires would be too long, making it difficult for satisfying the timing requirements and performance demands of such processors. Therefore, aside from a few dedicated instructions for transferring data between the scalar and vector register files, vector arithmetic instructions would typically specify all of the input operands as vector operands stored in vector registers.

However, recently vector processing techniques are starting to be used in smaller processor implementations with lower power consumption and smaller circuit area, so that the scalar register file and vector arithmetic datapath are closer together on the chip. The inventors have recognised that this makes it more practical for processing circuitry to access a scalar register when processing a vector arithmetic instruction. Nevertheless, one would normally expect that, for greatest flexibility in supporting different processing operations, each of the inputs to a vector operation should be specified as a vector, to allow different numeric values to be used for each of the operands in each of the lanes of the vector processing. One arithmetic operation that is relatively common in many data processing algorithms is a multiply-add operation, where two operands are multiplied together, and the product and a third operand are added or subtracted to generate a result. As the multiply-add operation is a three-input operation, one would expect a vector multiply-add instruction to specify three vector registers to define three input vectors.

However, there are typically few operations which require three input operands, and so if the multiply-add instruction specifies all of its inputs as vectors, this would require a third vector register read port to be implemented in the vector register file, which is unlikely to be used for other operations. Also, even if a particular processing apparatus does have more than two vector register read ports, if not all of the read ports are used by a given instruction then this may allow another instruction to be executed in parallel using the spare register read ports. Hence, by specifying at least one of the multiplier value and the addend value of the vector multiply-add operation as a scalar value, this avoids the need for a third vector register read port to be used for the vector multiply-add instruction, which can either save circuit area and power consumption by not implementing a third register read port at all, or allow improved performance by allowing another instruction to execute in parallel using a spare read port.

While one might expect that using a scalar register to specify one or both of the multiply value and addend value would limit the usefulness of the vector multiply-add instruction (since each of the lanes would be restricted to using the same value for the multiplier and/or the addend), in practice there are some relatively common use cases where at least one of the multiplier and the addend will anyway be the same value across each of the lanes. For example, a common operation in some data processing algorithms may be the evaluation of a polynomial of the form $ax^3+bx^2+cx+d$ for multiple values of x, which can be done using vector multiply-add instructions where the different values for x are allocated to different elements of an input vector and the coefficients a, b, c, d are the same for each lane. Hence, another benefit of providing a vector multiply-add instruction with at least one scalar input is that this eliminates the need for additional instructions to duplicate the same scalar value across each of the elements of an input vector, which would be required if the vector multiply-add instruction specified each of its operands as a vector. Hence, code size can be decreased or code density increased.

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by an instruction set architecture. For example the decoder 6 may interpret the opcodes of the decoded instructions and any additional control fields of the instructions to generate control signals which cause a processing circuitry 4 to activate appropriate hardware units to perform operations such as arithmetic operations, load/store operations or logical operations. The apparatus has a set of registers 10 for storing data values to be processed by the processing circuitry 4 and control information for configuring the operation of the processing circuitry. In response to arithmetic or logical instructions, the processing circuitry 4 reads operands from the registers 10 and writes results of the instructions back to the registers 10. In response to load/store instructions, data values are transferred between the registers 10 and the memory system 8 via the processing logic. The memory system 8 may include one or more levels of cache as well as main memory.

The registers 10 include a scalar register file 12 comprising a number of scalar registers for storing scalar values which comprise a single data element. Some instructions supported by the instructions decoder 6 and processing circuitry 4 are scalar instructions which process scalar operands read from scalar registers 12 to generate a scalar result written back to a scalar register.

The registers 10 also include a vector register file 14 which includes a number of vector registers each for storing a vector value comprising multiple data elements. In response to a vector instruction, the instruction decoder 6 controls the processing circuitry 4 to perform a number of lanes of vector processing on respective elements of a vector operand read from one of the vector registers 14, to generate either a scalar result to be written to the scalar registers 12 or a further vector result to be written to a vector register 14. Some vector instructions may generate a vector result from one or more scalar operands, or may perform an additional scalar operation on a scalar operand in the scalar register file as well as lanes of vector processing on vector operands read from the vector register file 14. Hence, some instructions may be mixed-scalar-vector instructions for which at least one of one or more source registers and a destination register of the instruction is a vector register 14 and another of the one or more source registers and the destination register is a scalar register 12. Vector instructions may also include vector load/store instructions which cause data values to be transferred between the vector registers 14 and locations in the memory system 8. The load/store instructions may include contiguous vector load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or store data from respective elements of a vector register to the discrete addresses.

The processing circuitry 4 may support processing of vectors with a range of different data element sizes. For example a 128-bit vector register 14 could be partitioned into sixteen 8-bit data elements, eight 16-bit data elements, four 32-bit data elements or two 64-bit data elements for example. A control register within the register bank 10 may specify the current data element size being used, or alternatively this may be a parameter of a given vector instruction to be executed.

The register bank 10 also includes registers for storing control information for controlling the operation of the processing circuitry 4. The control registers may include registers such as a program counter register for indicating an address of an instruction corresponding to a current point of execution, a stack pointer register indicating an address of a location in the memory system 8 of a stack data structure for saving/restoring register state when handling of the exception, and a link register for storing a function return address to which processing is to branch following the execution of a function. These are not illustrated in FIG. 1 for conciseness.

As shown in FIG. 1, the registers also include a loop counter 16 for tracking the progress of vectorised loops, an element size register 18 for storing a parameter indicating the number of bits in the data elements of the vectors being processed within a loop, a vector width register 20 for storing a parameter indicating the total number of bits in one vector register and a vector predicate register 22 for controlling predication of vector operations. In some examples, the vector width register 20 may be hardwired during the manufacture of the apparatus depending on the particular vector width implemented in the vector registers 14 for a given device. Alternatively, if the vector register file 14 supports different configurations with different vector widths then the vector width register 20 could be programmable to indicate the current width being used. Similarly, the element size register 18 could either be hardwired if a particular element size is always used for a given apparatus, or variable if the apparatus supports processing with vectors of different data element size. While the loop counter 16 is shown as a dedicated control register, other examples may use one of the general purpose scalar registers 12 to track the progress of vectorised loops.

Figure 2:
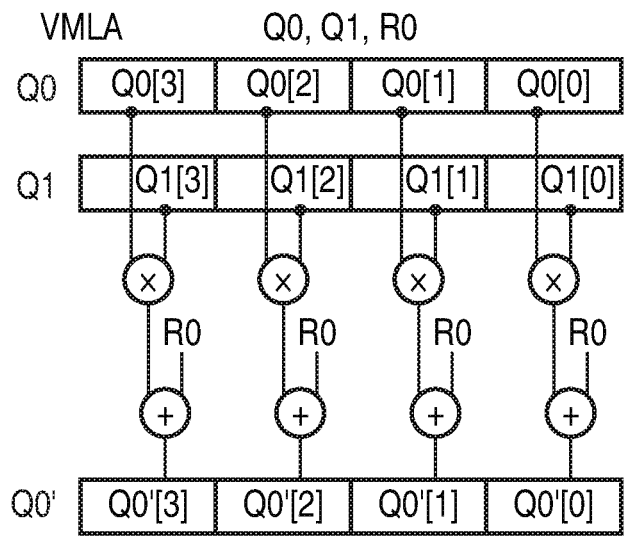
FIG. 2 illustrates an example of a first variant of a vector multiply-add instruction for which an addend value for the multiply-add operation is specified by a scalar register.

FIG. 2 schematically illustrates an example of processing a vector multiply-add instruction. The instruction specifies first and second vector registers Q0, Q1 and a scalar register R0. This example shows a destructive variant of the instruction where the first vector register Q0 also serves as the result register for the instruction so that the result data elements generated in the multiply-add operation are written to register Q0 to overwrite the values previously stored in the corresponding portions of the register. This avoids the need for encoding space for a separate destination register specifier in the instruction encoding, which can be useful as instruction encoding space is often at a premium.

FIG. 2 shows a first variant of the vector multiply-add instruction for which the scalar register R0 specifies an addend value to be used in a multiply-add operation in each lane of processing, while the vector registers Q0, Q1 specify the values to be multiplied together in each lane. Hence, each lane of processing generates a respective result data element Q0'[i] according to Q0[i]*Q1[i]+R0, where $0 \leq i \leq 3$ as there are four data elements per vector in this example. That is, each lane of processing generates a respective result data element corresponding to a sum of the addend value R0 with the product of the respective data elements of the first and second vectors Q0, Q1. The addend value R0 is the same for each of the lanes.

An example of a calculation where this type of instruction can be useful is shown below. Let us imagine that an application wishes to evaluate the following polynomial: $ax^3+bx^2+cx+d$ (there are many other instances where the instruction is useful), but this will serve as a good example). Using Homer's method, this can be expressed in a more computationally-efficient form $x(x(ax+b)+c)+d$. This usually equates to three multiply-accumulate operations.

An application wishes to efficiently evaluate this polynomial using a vector implementation in order to minimise the processing time. In traditional vector implementations, such a vector implementation would resemble the following (assuming 4 elements per vector):
polynomial_multiplication:

```
loop for all data/4:
    load coef a -> r0            LDR        r0 = a
    load data vector -> q0       VLDR       q0 = X
    duplication to vector r0 -> q1  VDUP    q1 = A
    load coef b -> r0            LDR        r0 = b
    duplicate to vector r0 -> q2    VDUP    q2 = B
    vector multiply q0 * q1 -> q1   VMUL (1) q1 = X * A
    vector add q1 + q2 -> q1     VADD (2)   q1 = q1 + B
    load coef c -> r0            LDR        r0 = c
    duplicate to vector r0 -> q2    VDUP    q2 = C
    vector multiply q0 * q1 -> q1   VMUL (1) q1 = q1 * X
    vector add q1 + q2 -> q1     VADD (2)   q1 = q1 + C
    load coef d -> r0            LDR        r0 = d
    duplicate to vector r0 -> q2    VDUP    q2 = D
    vector multiply q0 * q1 -> q1   VMUL (1) q1 = q1 * X
    vector add q1 + q2 -> q1     VADD (2)   q1 = q1 + D
    store result q1              VSTR
    Total: 16 instructions
```

By combining (1) and (2) into a single vector multiply-add instruction, this can increase the performance significantly: VMULADD Qd, Q1, Q2, Q3. However, the resulting instruction would then require three vector read ports (for Q1, Q2, and Q3), as well as a write vector port for Qd. This is a problem on small cores, as either there are not sufficient read ports available (limited due to area and/or power constraints), or they would steal resources from other instructions that would otherwise have been able to execute in parallel.

By using multiply-add instructions of the form (I1) Vector=vector*vector+scalar or (I2) Vector=vector*scalar+vector, these instructions avoid the vector register file read port constraints by instead reading from the scalar register file. With the help of these new instructions, the example algorithm above can be simplified to:
polynomial_multiplication:

```
loop for all data/4:
    load coef a -> r0            LDR        r0 = a
    load data vector -> q0       VLDR       q0 = X
    duplication to vector r0 -> q1  VDUP    q1 = A
    load coef b -> r0            LDR        r0 = b
    vector multiply add q0 * q1 + r0 -> q1  (I1)  q1 = X * A + b
    load coef c -> r0            LDR        r0 = c
    vector multiply add q0 * q1 + r0 -> q1  (I1)  q1 = q1 * X + c
    load coef d -> r0            LDR        r0 = d
    vector multiply q0 * q1 + r0-> q1       (I1)  q1 = q1 * X + d
    store result q1              VSTR
    Total: 10 instructions
```

Further optimisations are possible, such as taking the coefficient loads and initial duplication outside the loop, assuming the necessary registers are available. It is also possible to pipeline the processing of several data vectors as explained in FIGS. 8 to 10 below, which makes for a highly efficient implementation. The above examples shown one use case for the instruction, but the proposed instructions are naturally suitable for many other use cases.

Figure 3:
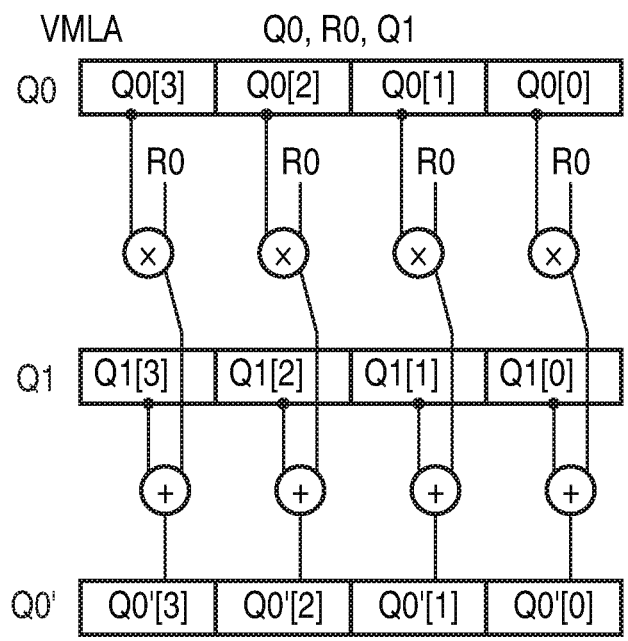
FIG. 3 shows an example of a second variant of the vector multiply-add instruction for which a multiplier value for the multiply-add operation is specified by a scalar register.

FIG. 3 shows a second variant of the vector multiply-add instruction. Again, the instruction specifies two vector registers Q0, Q1 and a scalar register R0 and the first vector register Q0 serves as the destination register for the instruction. Again, each lane of processing corresponds to a multiply-add operation where two values are multiplied to form a product and the product is then added to an addend value. However, in this variant, the scalar register specifies the multiplier value R0 to be multiplied with the respective elements of the first input vector Q0 in each lane while the addend is the corresponding data element of the second input vector Q1. Hence, for the second variant a given results data element Q0'[i] is generated according to Q0[i]*R0+Q1[i]. Again, again, 0≤i≤3 in this example.

Figure 4:
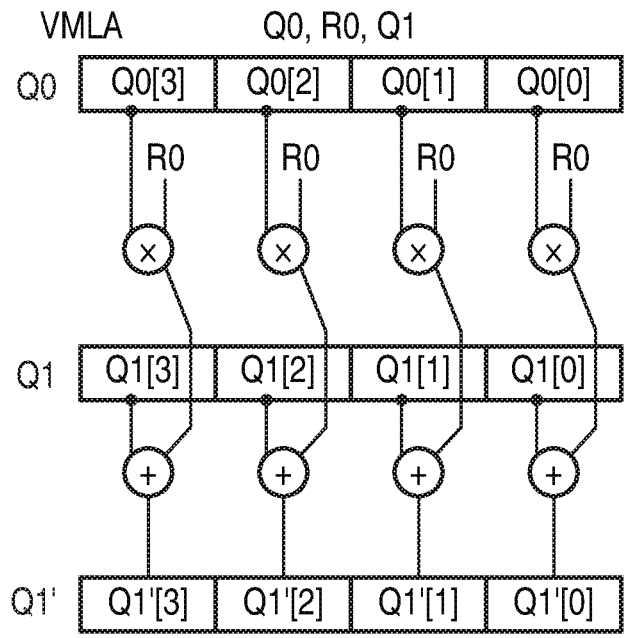
FIG. 4 shows another example of the second variant.

FIG. 4 shows an alternative version of the second variant shown in FIG. 3, where the second vector register Q1 serves as the destination register instead of Q0. Hence, in FIG. 3 the vector operand being multiplied is overwritten with the result, while in FIG. 4 the vector operand serving as the addend is overwritten with the result. Some systems may support only one of the versions shown in FIGS. 3 and 4, while other systems may support both types.

Figure 5:
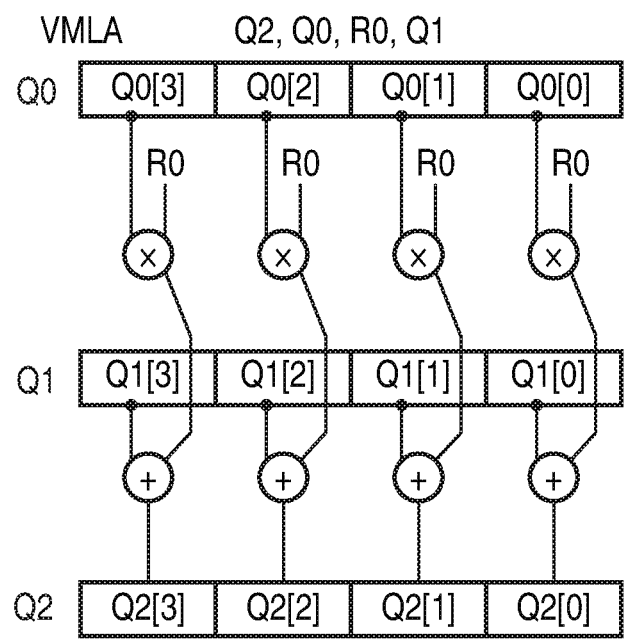
FIG. 5 shows a non-destructive variant of the vector multiply-add instruction.

Also, FIG. 5 shows an example of a non-destructive variant of the vector multiply-add instruction, which specifies an additional vector register Q2 serving as the destination register for the instruction, separate from the two vector registers Q0, Q1 which define the input operands. With this variant, the input operands are not overwritten as a result of the multiply-add operation, and so are still available for processing by subsequent instructions. Some systems may support a non-destructive variant as shown in FIG. 5 in addition to a destructive variant as shown in FIGS. 2-4, while other implementations may choose only one of the destructive and non-destructive variants. While FIG. 5 shows an example of the second variant of the instruction implemented as a non-destructive instruction (where the scalar register specifies the addend), other examples may similarly implement a non-destructive version of the first variant (where the scalar register specifies the multiplier).

Similarly, while the examples discussed below are described for conciseness using an example corresponding to the first variant of the vector multiply-add instruction as shown in FIG. 2, where the scalar value specifies the addend for each lane, it will be appreciated that each of these examples could also be applied to the second variant shown in FIG. 3 or 4 where the scalar specifies the multiplier value.

Also, another variant of the vector multiply-add instruction may specify both the multiply value and the addend value using respective scalar values. For such a variant, the instruction would specify one vector operand and two scalar operands using the corresponding vector and scalar registers. For example an instruction may specify vector register Q0 and two scalar registers R0, R1, and may generate each result data element according to Q0'[i]=Q0[i]×R0+R1. Again, a non-destructive version specifying two vector registers Q0, Q1 and two scalar registers R0, R1 could also be provided where Q1[i]=Q0[i]×R0+R1.

Hence, given the different variants discussed above, in general the vector multiply-add instruction may specify at least one vector register and at least one scalar register, and the third operand may be either a vector or a scalar, depending n the variant.

The processing circuitry 4 may perform the lanes of processing for a given vector instruction in parallel, sequentially, or partially in parallel and partially in sequence. For example, some implementations may have sufficient arithmetic circuit units to perform all of the lanes of processing in parallel to generate all of the result data elements in the same cycle. Other circuit implementations may provide a single set of arithmetic units which processes a single lane at a time, and in this case each lane may be processed sequentially in separate cycles. Although performance in this case may be slower, sequentially processing the vector lanes still provides an advantage over scalar implementations because it reduces the number of instruction fetches and instruction decoding operations required to process a given algorithm, reducing power consumption. Other implementations may have arithmetic units which can process up to a certain bit width in parallel, which may be less than the total width of the vector. In this case a block of two or more lanes of processing can be performed in parallel, but if the vector size is greater than the bit width supported in hardware then multiple passes through the arithmetic units can be performed sequentially, so that the vector processing is done partially in parallel and partially in sequence.

The above examples show cases where the result register Q0' is updated with result data elements in each of the lanes of processing. However, the operations associated with a given portion of the result vector may be masked based on a predication indication which identifies whether the given portion should be masked. There are a number of ways of implementing such predication, two of which are shown in FIGS. 6 and 7.

Figure 6:
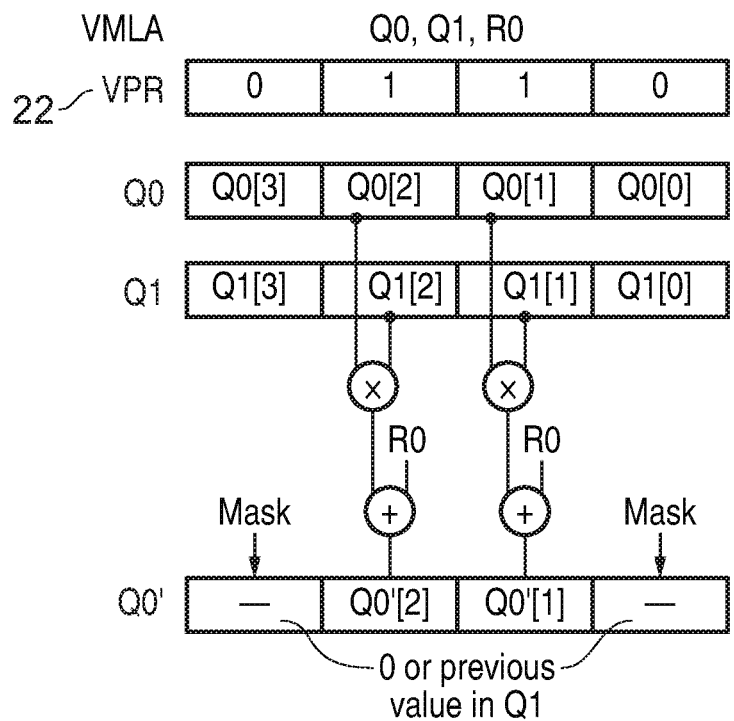
FIG. 6 shows an example of masking an operation associated with certain portions of a result vector based on predication indications.
Figure 7:
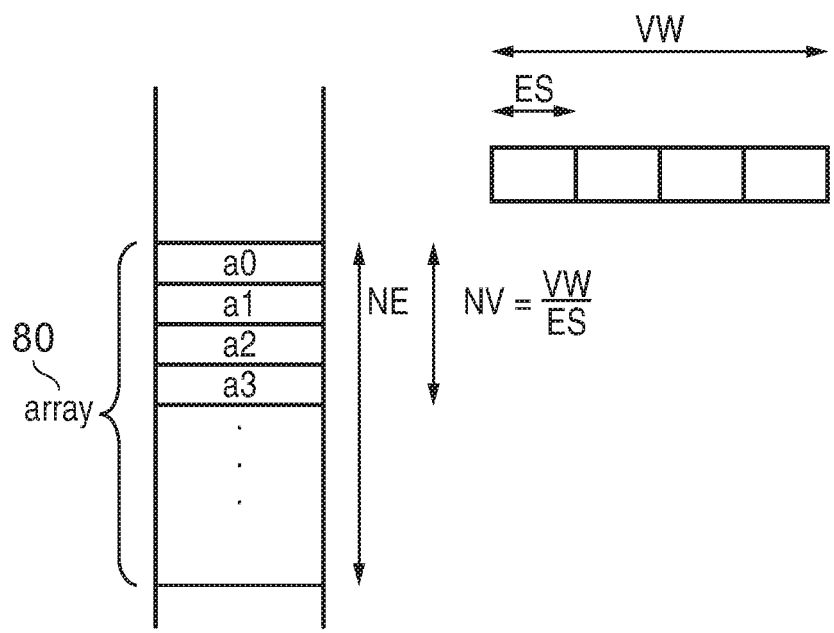
FIG. 7 shows an example of loop-based predication for masking lanes of vector processing when the end of a vectorised loop is reached.
Figure 7:

FIG. 6 shows an example where the vector predicate register (VPR) 22 includes a number of predicate bits which may be set to 0 or 1 depending on whether the corresponding portion of the result vector should have its operation masked. For example, each bit of the VPR 22 may correspond to a portion of the result vector corresponding to the smallest data element size supported by the apparatus 2, and when a bit associated with a given portion of the result vector is 0 this may cause the corresponding operation to be masked to prevent the result of the vector operation being written to that portion of the result vector. The masking can be implemented in different ways. In one example, a predetermined value (e.g. zero) may be written to the portions of the result vector to be masked. In another example, the masked portions of the result vector may retain their previous value so that they are not updated as a result of the vector instruction. Another option is to prevent the arithmetic operation for a masked lane of processing being performed at all. Some implementations may support only one of these masking options. Others may support more than one option, and the programmer or compiler can specify which particular masking option is to be used for a given instruction (e.g. an instruction may be specified as using zeroing-masking where zero is written to the masked portions or merging-masking where the results for non-masked portions are merged with the existing values in the masked portions which preserve their previous value). In the example shown in FIG. 6, the VPR bits in lane 0 and 3 are 0, and the VPR bits in lanes 1 and 2 are 1, which indicates that lane 0 and 3 are to be masked while lanes 1 and 2 are unpredicated and are processed in the same way as FIG. 2 to update the corresponding portions of the result vector. While FIG. 6 shows an example applying to the first variant of the vector multiply-add instruction shown in FIG. 2, it will be appreciated that it could also be applied to the second variant or any of the other variants described herein.

Predication can be useful since often a given processing algorithm may require a conditional operation to be performed where a calculation may only be required if a target data value meets a certain condition (e.g. whether it is greater than a threshold). A vector comparison instruction may compare several target values with the relevant criteria, and set the bits of the VPR 22 according to whether the criteria for each lane are satisfied, and then this may control the execution of a subsequent vector instruction such as the vector multiply-add instruction shown in FIG. 6.

FIG. 6 shows a case where the VPR bits are set so that entire lanes of processing are masked in the subsequent vector multiplying-add instruction. However, it is also possible to mask portions of the result vector which correspond to a width smaller than the data element size being used for the vector instruction. For example, if the compare instruction which sets the VPR 22 uses a smaller data element size than the subsequent multiply add instruction, then this may result in a given lane of processing for the multiply-add instruction having some VPR bits set to 1 and some bits set to 0, which may result in only part of the result data element for that lane being written to the corresponding portion of the result vector and the other part being masked. Hence, masking can be controlled at a finer granularity than the data element size.

FIG. 6 shows an example where the predicate register 22 is not specified in the encoding of the vector multiply-add instruction. Instead, the predicate register 22 is a default register which implicitly controls the masking of any vector instruction. However, another approach is to encode the vector multiply-add instruction with an explicit reference to a predicate register which specifies the predicate indications to be used for controlling masking. For example, a bank of two or more predicate registers can be provided, and different sets of predicate bits can be written to the predicate registers for controlling the predication of subsequent vector instructions which each reference the particular predicate register to be used for that instruction. The approach using explicit predicate register references can have some advantages in reducing code size since there may be less need to update the predicate register repeatedly if multiple sets of predicate bits can be retained simultaneously. On the other hand, the approach shown in FIG. 6 using an implicit predicate register which is not referenced by the instruction can have advantages in saving instruction encoding space and reducing circuit area and power consumption by providing fewer predicate registers. Either approach can be used with the vector multiply-add instructions of the present technique.

FIG. 7 shows a second example of predication. A common use for vector instructions is in vectorised loops where a certain sequence of operations needs to be applied to each element a0, a1, etc. of an array 80 stored in memory. A loop iterating once per element in the high level code is compiled into vectorised code comprising a loop with fewer iterations, each of which loads a block of elements into a vector register, processes the elements using a series of vector instructions, and stores the results of each lane of processing back to memory. Hence, each iteration may process a block of elements corresponding to the number of data elements in one vector register. If the total number of elements in the array to be processed is NE, and the number of data elements in one vector is NV (equal to the vector width VW divided by the data element size ES), then the entire array can be processed in a minimum of NE/NV iterations. However, often the total number of elements NE may not be an exact multiple of the number of elements NV in one vector, and so in the last iteration of the loop, not all of the elements of the vector will be filled with real values to be processed. If the processing in unfilled lanes is allowed to proceed unmasked, this can cause errors. For example, the memory address space beyond the end of the array 80 may not have been mapped in page tables, so there could be a memory access fault or corruption of data adjacent to the array if a load/store operation is performed for one of the "unused" lanes in the final iteration processing the tail of the array.

Therefore, it can be desirable to mask the operations in the unused lanes in the final iteration of the loop. As shown in FIG. 1, the processing circuitry 4 may be provided with loop predication circuitry 90 for controlling which lanes of a given vectorised loop are enabled or masked. On starting a vectorised loop, the loop counter 16 is set to a value specifying the total number of elements NE to be processed in the loop. For example, a loop start instruction may specify the number of elements to be processed, and the loop counter 16 may be set in response to the loop start instruction. At the end of each iteration of the loop, the number of elements in one vector NV is subtracted from the loop counter 16, to calculate $NE_{rem}$ the number of remaining elements to be processed. On starting a given loop iteration, if $NE_{rem}$<NV, then the loop predication circuitry 90 controls the processing circuitry 4 to mask operations associated with the upper $NV-NE_{rem}$ lanes of vector processing, e.g. by suppressing the lanes of vector processing themselves (e.g. preventing load/store requests being issued) and/or disabling writing of results of processing in the masked lanes or setting the masked lanes to zero as discussed above.

Hence, the loop predication circuitry 90 may be another way of implementing predication independent of the encoding of the vector multiply add instruction itself, as it may directly control the processing circuitry to mask certain lanes without requiring any explicit predicate reference in the instruction encoding. The approaches shown in FIGS. 6 and 7 may be combined and in some cases the predicate indications provided by the predication circuitry 90 may be ANDed with predicate indications provided from the VPR 22 or another type of predicate register to control overall masking of the vector processing, so that the result is written to those portions of the result vector which are not masked by either the loop predication circuitry 90 or the predicate register 22.

While predication is not shown in the other examples for conciseness, predication could be used with any of the examples shown herein. Therefore, it will be appreciated that while the processing circuitry is configured to perform multiple lanes of processing in response to the vector multiply-add instruction, it need not always carry out all of the lanes, depending on the masking being applied.

Figure 8:
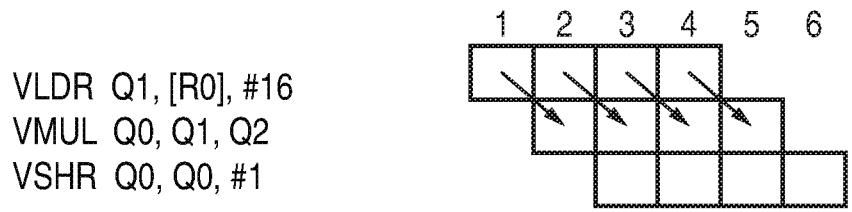
FIGS. 8 to 10 show examples of overlapping respective beats of execution of vector instructions.
Figure 9:
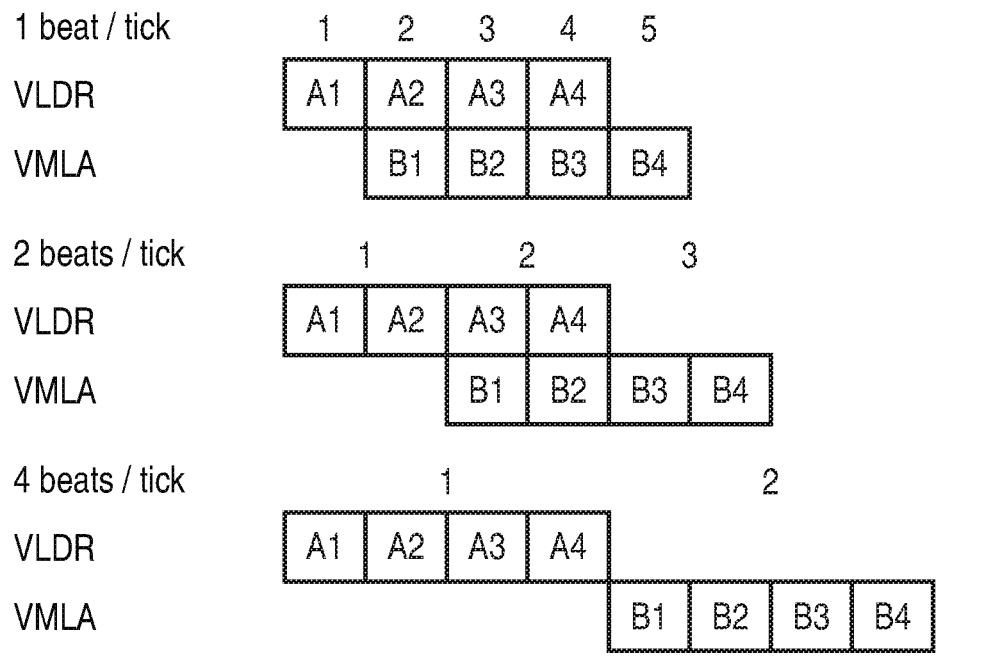
Figure 10:
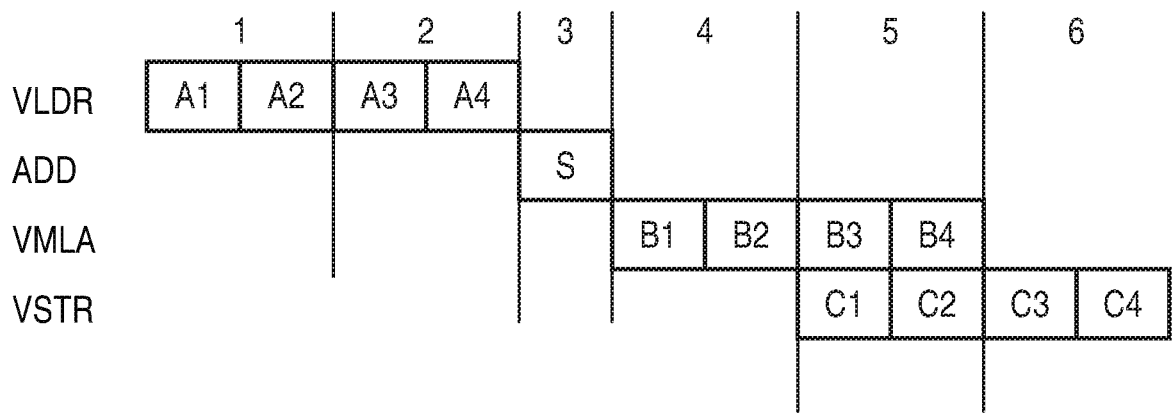

As shown in FIGS. 8 to 10, processing of vector instructions (including the vector multiply-add instruction is described herein) may be interleaved so that processing one vector instruction can start before the previous vector instruction has completed. In particular, in response to a given vector instruction the processing circuitry 4 may perform multiple beats of processing each corresponding to a section of the vector (where that section could be smaller than, equal to, or larger than the particular data elements size being used for that vector instruction), and the processing circuitry may support overlapped execution of first and second vector instructions, in which a first subset of beats of the second vector instruction is performed in parallel with a second subset of beats of the first vector instruction.

This approach can be useful because the processing circuitry 4 may include a number of distinct hardware blocks for processing different classes of instructions. For example, load/store instructions which interact with a memory system 8 may be processed by a dedicated load/store unit, while arithmetic or logical instructions could be processed by an arithmetic logic unit (ALU). The ALU itself may be further partitioned into a multiply-accumulate unit (MAC) for performing in operations involving multiplication, and a further unit for processing other kinds of ALU operations. A floating-point unit can also be provided for handling floating-point instructions. Pure scalar instructions which do not involve any vector processing could also be handled by a separate hardware block compared to vector instructions, or reuse the same hardware blocks.

In some applications such as digital signal processing (DSP), there may be a roughly equal number of ALU and load/store instructions and therefore some large blocks such as the MACs can be left idle for a significant amount of the time. This inefficiency can be exacerbated on vector architectures as the execution resources are scaled with the number of vector lanes to gain higher performance. On smaller processors (e.g. single issue, in-order cores) the area overhead of a fully scaled out vector pipeline can be prohibitive. One approach to minimise the area impact whilst making better usage of the available execution resource is to overlap the execution of instructions, as shown in FIG. 8. In this example, three vector instructions include a load instruction VLDR, a multiply instruction VMUL and a shift instruction VSHR, and all these instructions can be executing at the same time, even though there are data dependencies between them. This is because element 1 of the VMUL is only dependent on element 1 of Q1, and not the whole of the Q1 register, so execution of the VMUL can start before execution of the VLDR has finished. By allowing the instructions to overlap, expensive blocks like multipliers can be kept active more of the time.

Hence, it can be desirable to enable micro-architectural implementations to overlap execution of vector instructions. However, if the architecture assumes that there is a fixed amount of instruction overlap, then while this may provide high efficiency if the micro-architectural implementation actually matches the amount of instruction overlap assumed by architecture, it can cause problems if scaled to different micro-architectures which use a different overlap or do not overlap at all.

Instead, an architecture may support a range of different overlaps as shown in examples of FIG. 9. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat is defined by the architecture and can be an arbitrary fraction of the vector. In the examples of FIG. 9 a beat is defined as the processing corresponding to one quarter of the vector width, so that there are four beats per vector instruction. Clearly, this is just one example and other architectures may use different numbers of beats, e.g. two or eight. The portion of the vector corresponding to one beat can be the same size, larger or smaller than the data element size of the vector being processed. Hence, even if the element size varies from implementation to implementation or at run time between different instructions, a beat is a certain fixed width of the vector processing. If the portion of the vector being processed in one beat includes multiple data elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form a data element.

As shown in FIG. 9 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However such micro-architecture techniques are not visible to the software as a tick is atomic at the architecture level. For conciseness such micro-architecture are ignored during further description of this disclosure.

As shown in the lower example of FIG. 9, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 9, instruction execution can be overlapped with the first and second beats of a second vector instruction carried out in parallel with the third or fourth beats of a first instruction, where those instructions are executed on different execution units within the processing circuitry (e.g. in FIG. 9 the first instruction is a load instruction executed using the load/store unit and the second instruction is a multiply accumulate instruction executed using the MAC).

A yet more energy/area-efficient implementation may provide hardware units which are narrower and can only process a single beat at a time, and in this case one beat may be processed per tick, with the instruction execution overlapped and staggered by one beat as shown in the top example of FIG. 9 (this is the same as the example shown in FIG. 8 above).

It will be appreciated that the overlaps shown in FIG. 9 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 may be provided with circuitry for controlling the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

As shown in FIG. 10, the overlap between two vector instructions may also be prevented if there is an intervening scalar instruction. This is because the scalar instruction could depend on the outcome of the last beat of the vector instruction and the second vector instruction could depend on the scalar result in all of its beats, so it may be safer to avoid overlapping vector instructions with scalar instructions.

Figures 11, 12:
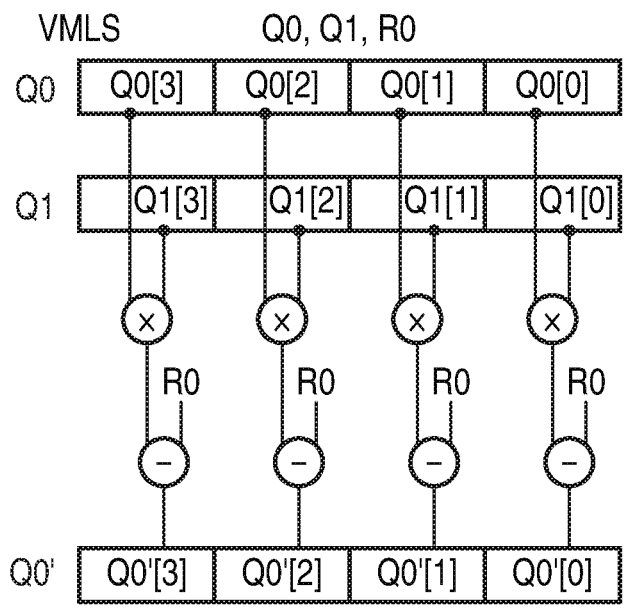
FIG. 11 shows a subtract variant of the vector multiply-add instruction.
FIG. 12 is a table illustrating processing of a saturating variant of the vector multiply-add instruction.

The examples above show add variants of the vector multiply-add instruction where the addend is added to the product of the input vector element and the multiplier. However, as shown in FIG. 11 it is also possible to provide a subtract variant of the vector multiply-add instruction where the addend is subtracted from the product. FIG. 11 shows a subtract variant for the first form of the instruction showing in FIG. 2, but it will be appreciated that a subtract variant could also be provided for the second form of the introduction shown in FIG. 3 or 4. Similarly, a non-destructive version of the subtract variant could also be provided similar to FIG. 5. Hence, for the subtract variant the result data element of the result vector corresponds to the difference between the product and the addend (e.g. $Q0'[i]=Q0[i]*Q1[i]-R0$). Therefore, references to the multiply-add operation herein encompass multiply-subtract operations. In practice, both the add and subtract variants may be calculated using a common add circuit since the subtract variant may be implemented simply by generating the two's complement of the addend to negate the addend before adding it to the product.

The vector multiply-add operation may calculate each lane result using either modular or saturating arithmetic. In modular arithmetic, when a result of the operation exceeds the maximum value which can be represented using the number of bits available in the result value, the result 'wraps around' to the lowest end of the range representable using those bits and the result effectively indicates the least significant portion of the result value which would have been represented had a greater number of bits been available (an overflow bit may be set in a control register to indicate that the result overflowed). That is, the result value is effectively equivalent to the true result modulo some constant which depends on the number of bits in the result value.

In contrast, with saturating arithmetic, when the true result exceeds the maximum possible value representable in the result value, then the result is clamped at the maximum value. Similarly, if the result is less than the minimum value representable in the result value, then the result is clamped to the minimum value and does not wrap around. As shown in FIG. 12, when the result of a given lane L[i] is less than the minimum bound for the saturation, the result data element $Q0'[i]$ is set equal to that minimum bound, when the lane result L[i] is equal to the minimum or maximum bound or between the minimum and maximum bounds, the result data element $Q0'[i]$ is simply equal to the lane result, and when the greater result is greater than the maximum bound then the result data element $Q0'[i]$ is equal to the maximum bound. A sticky bit in a control register is set to 1 if saturation has occurred (that is, if either the lane result L[i] is less than the minimum value or greater than the maximum value). The sticky bit retains its previous value if the result did not saturate. Hence, when processing a sequence of instructions, the sticky bit for a given lane once set to 1 will remain at 1 for the rest of the sequence to indicate that saturation occurred at some point during the sequence. Some systems may support only one or modular or saturating arithmetic for the vector multiply-add instruction. In other cases, the processing circuitry 4 may support vector multiply-add instruction variants for both forms of arithmetic.

Figure 13:
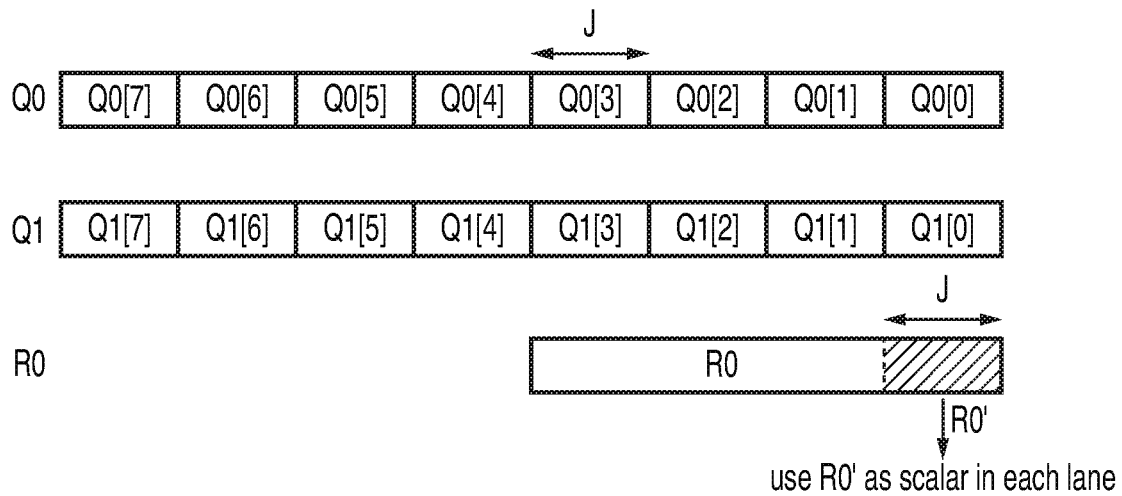
FIG. 13 shows how a smaller portion of the scalar value stored in the scalar register can be used for the vector multiply-add operation when the scalar register is wider than the data element size of the vector operands.

The above examples show cases where the vector multiply add instruction is applied to vectors having 4 data elements each, but clearly this is not essential and the vector may comprise any number of data elements. As mentioned above, in some systems a given number of bits of a vector operand can be divided up into different data element sizes e.g. 128-bit vector could be divided up into 8-bit, 16-bit, 32-bit or 64-bit data elements. Hence, FIG. 13 shows an alternative example where each vector comprises 8 data elements.

For some data element sizes, the size of a data element may be narrower than the width of one of the scalar registers 12. For example, as shown in FIG. 13, each data element for a given instance of execution of the vector multiply-add instruction may have a certain number of bits J, but the scalar register R0 may have more than J bits. In this case, only a portion of the scalar value in the scalar register may be used as the addend value or the multiplier value for the multiply-add processing in each lane of the vector processing. For example, as shown in FIG. 13, the selected portion R0' of the scalar register could be the least significant J bits, where J is the current data element size used for the presently executed instruction. Alternatively, other examples may select the portion of the scalar value to be used for the vector processing as the most significant J bits of the scalar register. Hence, it will be appreciated that in all the examples discussed herein, it is not essential for the entire scalar value in the scalar register to be used for the multiply-add processing, but it is possible for only a portion of the scalar value with a width corresponding to the data element size to be used as the multiplier value or the addend value.

Figure 14:
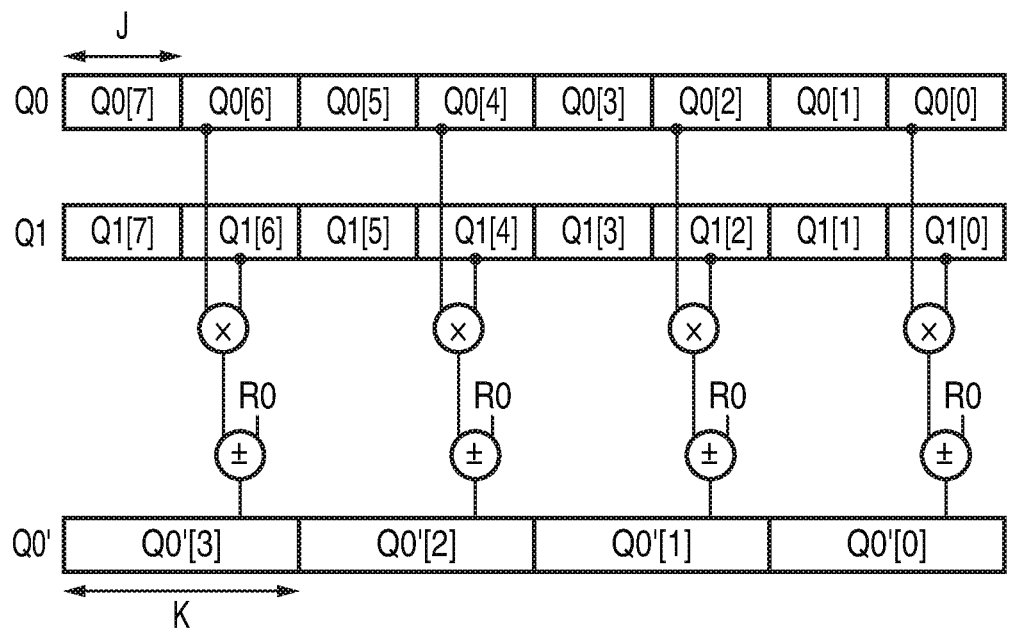
FIG. 14 shows an example of an element-widening variant of the vector multiply-add instruction.

Also, while the examples shown above generate a result value with data elements of the same size as the data elements of the input vectors, this is not essential and as shown in FIG. 14 an element-widening variant of the vector multiply-add instruction may be provided which generates a result vector value with K-bit result data elements from one or more input vectors having J-bit data elements, where K>J. When the result data elements are larger than the input data elements, then not all of the input data elements may contribute to the result. For example, as shown in the case of FIG. 14, each result data element Q0'[i] may be generated based on the corresponding data elements in an even-numbered lanes 0, 2, 4, 6 of the input vectors, and the odd numbered elements may be ignored. An alternative example may select the elements from different positions, e.g. using the odd-numbered elements, or using a block of adjacent elements at the upper or lower end of the vector. Alternatively all the input elements may be used so that the number of input elements is the same as the number of result elements, in this case the width of the result vector would be larger than the width of the input vector. It can be particularly useful to implement an element widening instruction where K=2J so that each result data element is twice the size of the input data elements. This is because the multiplication performed in a given lane of the multiply-add processing will produce a result with twice the number of bits of the input and so by using the element-widening variant of the vector multiply-add instruction, this increased precision can be retained in the result.

On the other hand, for element-size-preserving variants of the vector multiply-add instruction where the result vector value has result data elements of the same size (J bits) as the data elements of the input vectors, there are different options for how to truncate a lane result L[i] of the multiply-add operation to generate a J-bit result data element. In general, multiplying two J-bit data elements together and adding a third J-bit data element may generate a 2J+1-bit lane result L[i] comprising bits [2J:0], where bit 0 refers to the least significant bit and bit 2J refers to the most significant bit.

Figure 15:
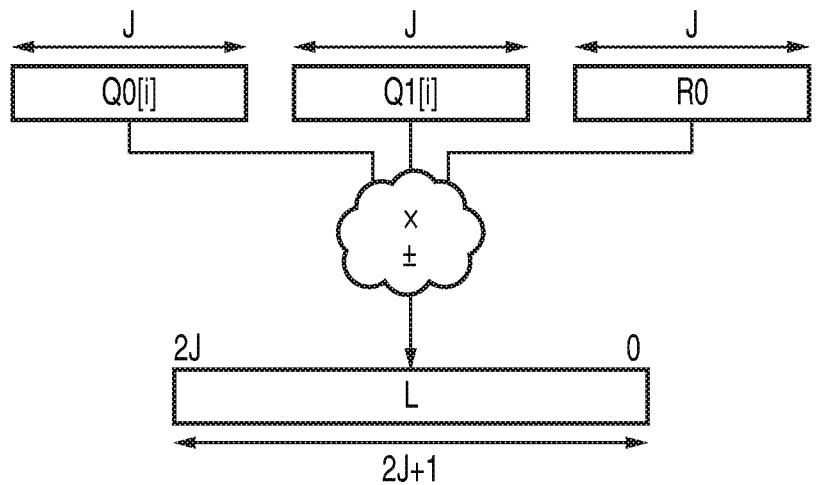
FIG. 15 shows five different examples of truncating a lane result to generate a corresponding result data element for an element-size-preserving variant of the vector multiply-add instruction.
Figure 15:
Figure 15:
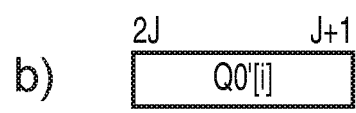
Figure 15:
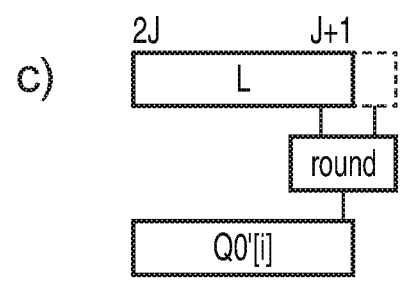
Figure 15:
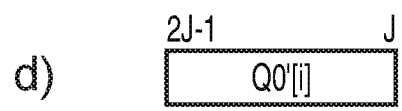
Figure 15:
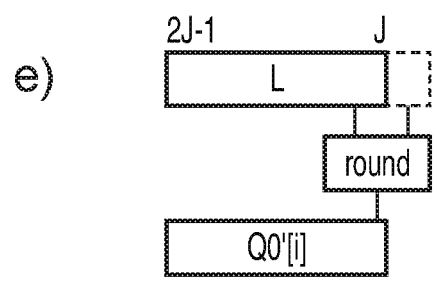

FIG. 15 shows five examples for how to truncate the lane result L[i] to generate the corresponding result data element Q0'[i]

a) the least significant J bits of the lane result L[i] can be selected (e.g. bits [J−1:0] of the 2J+1-bit lane result).
b) the most significant J bits of the lane result L[i] can be selected (e.g. bits [2J:J+1] of the 2J+1-bit lane result).
c) the most significant J bits of the lane result L[i] can be selected and rounded based on at least one less significant bit of the lane result. For example, the most significant bit not included in the selected portion could be added to the selected portion to round to the J-bit result data element Q0'[i], or alternatively more than one less significant bit can be used for rounding to implement more complex rounding modes. By performing rounding, negative bias to the result caused by the truncation can be avoided.
d) the most significant bit [2J] of the lane result L[i] can be ignored, and the next J most significant bits [2J−1:J] selected to form the result. The top bit of the 2J+1-bit result will typically only be 1 if all three of the J-bit input elements are at or near their maximum values, so often will be 0 for most calculations. Therefore, the next J bits other than the top bit may more often provide useful information, so it can be preferable to use these for the truncated result.
e) in a similar way to example c), bits [2J−1:J] of the lane result L[i] can be rounded based on at least one less significant bit to generate the result.

Some implementations may support only one of these truncation techniques, while others may support more than one and allow the programmer/compiler to specify which is to be used for a given instruction.

Note that while the truncated result corresponds to the value which would be generated if the full 2J+1-bit lane result was actually generated and then truncated in the way shown in FIG. 15, it is not essential for the hardware to actually generate the full 2J+1 bits of the lane result. In some cases, it may be possible for the hardware to directly generate the truncated value from the input operands (e.g. in the example of part a) the upper bits of the lane result need not be generated during the multiply-add operation). Therefore, it is sufficient that the hardware generates a result data element which corresponds to the selected bits truncated from the 2J+1-bit lane result value, but needs not actually generate the result data element in this way.

Figure 16:
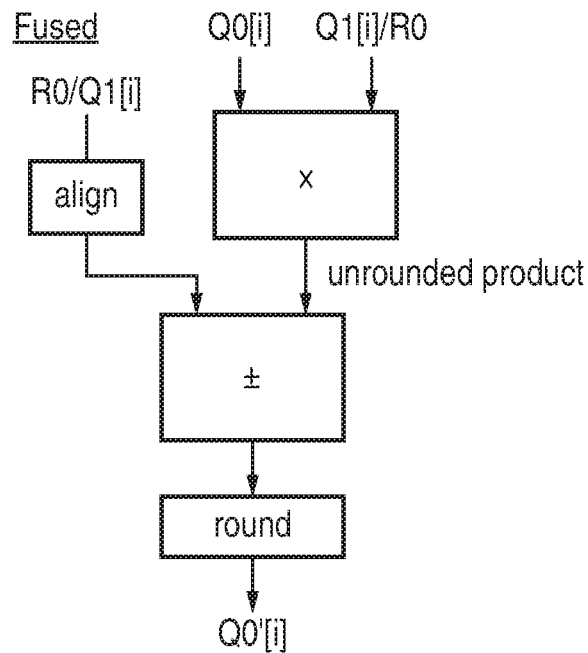
FIGS. 16 and 17 show fused and split variants of a floating-point vector multiply-add operation.
Figure 17:
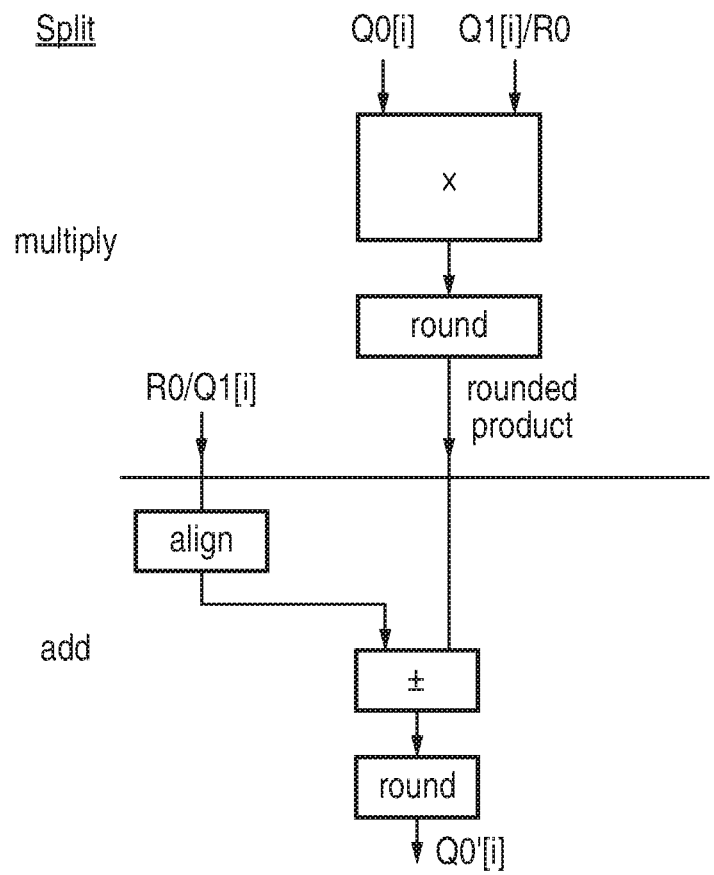

Some implementations may support both integer/fixed-point variants of the multiply-add instructions and floating-point variants. Alternatively, other implementations may support only an integer/fixed-point variant, or a floating-point variant of the vector multiply-add instruction. For an integer or fixed-point variant of the vector multiply-add instruction, the instruction decoder may control the processing circuitry to perform the vector multiply-add operation to generate each result data element using fixed-point or integer arithmetic (e.g. two's complement binary arithmetic). On the other hand, for a floating-variant, floating-point arithmetic may be used. Unlike integer or fixed-point values where each bit of the value has a certain fixed significance, with a floating-point value the significant bits of a data value are represented by a significand and a separate exponent is provided to indicate the significance of the significand. Typically different processing units within the processing circuitry 4 may be provided for the floating point arithmetic and the integer/fixed-point arithmetic respectively, since the floating-point unit may require additional circuitry for rounding of floating-point values (to round a processing result to a value which can be represented using the particular floating-point format being used), or for alignment of floating point operands (to generate values of equivalent significance before adding or subtracting them).

Where a floating-point variant of the instruction is supported, this could be implemented as a fused multiply-add operation or a split multiply-add operation as shown in FIGS. 16 and 17 respectively. With a fused multiply-add, the multiplication is performed to generate an unrounded product value, and the unrounded product is added to the addend value without first rounding the product. Hence, with the fused operation of FIG. 16 there is only a single rounding step, which is performed after the addition or subtraction of the product and the addend has been performed. This approach has some advantages since avoiding the additional rounding step retains the increased precision of the unrounded products, and can provide more accurate results, while it also enables the shifts for aligning the addend value with the unrounded product to be performed in parallel with the multiplication itself to improve performance (although some approaches to fused multiply-adds may choose to delay the alignment until later to allow the addend value to be input at a later stage of the operation, which can improve pipelining between different instructions).

On the other hand, with the split multiply-add approach shown in FIG. 17, the multiplication is performed first, a rounding step is performed to generate a rounded product, and the rounded product is then added to the aligned addend in a subsequent addition or subtraction stage, followed by a second rounding operation to round the sum or the difference produced by the adder to generate the end result. The split approach may in some cases be simpler to implement in hardware since it may overlay more efficiently with existing multiply and add circuitry provided for executing stand alone multiply or add instructions.

Hence, some system designs may implement only a fused multiply-add, or only a split multiply-add for the floating-variant of the vector multiply add instruction. Other systems may support both types of operation, so that there may be separate fused multiply-add and split multiply-add variants of the floating-point vector multiply-add instruction.

A number of variants of the vector multiply-add instruction are discussed above. In general, these variants can be combined in any desired combination, e.g. a split multiply-add floating-point variant which specifies the addend value as a scalar value and uses a destructive form where one of the input vectors is also the destination register. Therefore, while not all combinations of these instructions have been described for conciseness, it is possible to combine the different variants as desired. In general, the different variants of the instruction can be distinguished in any way, e.g. by using different instruction opcodes, or by using another bitfield of the instruction encoding to specify what variant of the operation is to be performed by the processing circuitry. Some parameters defining the variant of the multiply-add instruction could also be specified separately from the instruction encoding, e.g. using a control bit in a control register for example.

Figure 18:
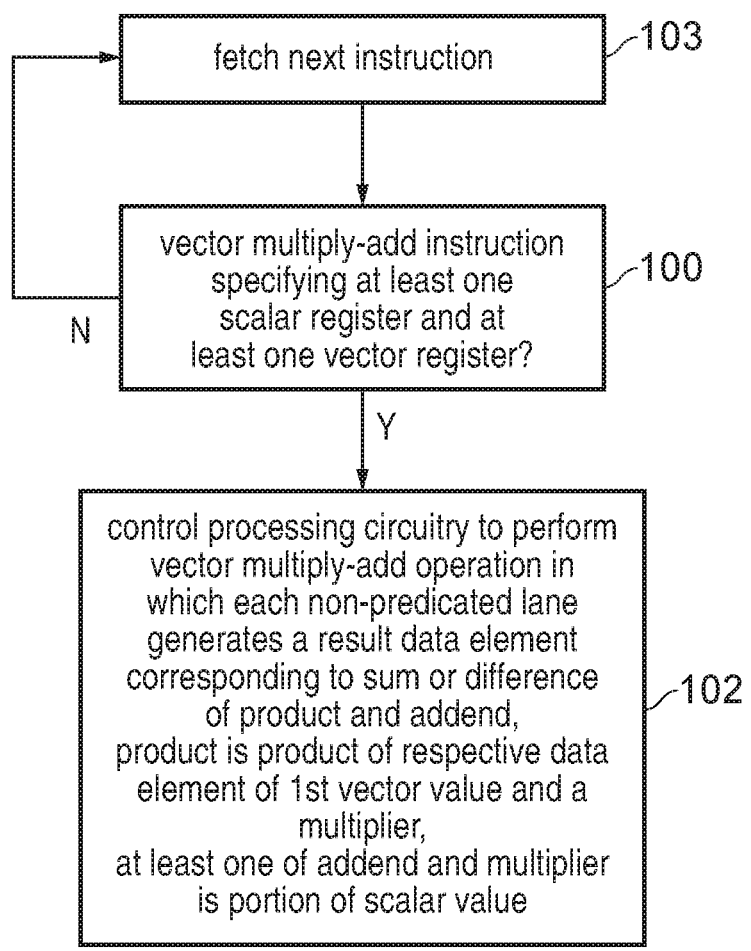
FIG. 18 is a flow diagram illustrating a method of processing a vector multiply-add instruction.

FIG. 18 is a flow diagram illustrating an example of processing of vector instructions. At step 103 the next instruction to be executed is fetched from the memory system 8. At step 100 the instruction decoder 6 determines whether the fetched instruction to be processed is the vector-multiply-add instruction which specifies at least one scalar register and at least one vector register. If not then the instruction is processed in a manner appropriate to the type of instruction encountered. When such a vector multiply-add instruction is encountered, then it is decoded and the instruction decoder 6 generates control signals at step 102 to control the processing circuitry 4 to perform a vector multiply-add operation comprising a number of lanes of vector processing. Each non-predicated lane generates a result data element which corresponds to a sum or difference of a product value and an addend value, where the product value is the product of a respective data element of the first vector value and a multiplier. At least one of the addend and multiplier values is specified as a portion of a scalar value stored in a scalar register specified by the vector multiply-add instruction.

In summary, by providing a vector multiply-add instruction which uses a scalar register to identify one or both of the addend and the multiplier, this provides an efficient way of processing data for a range of common arithmetic operations that is particularly well suited to processor cores with limited vector register read ports, either because only a limited number are physically provided or because resources are shared between simultaneously execution instructions. The instructions also help to reduce the number of instructions required for implementing certain processing algorithms thereby decreasing code size or increasing code density. Reducing the number of instructions to be executed may also increase performance.

Figure 19:
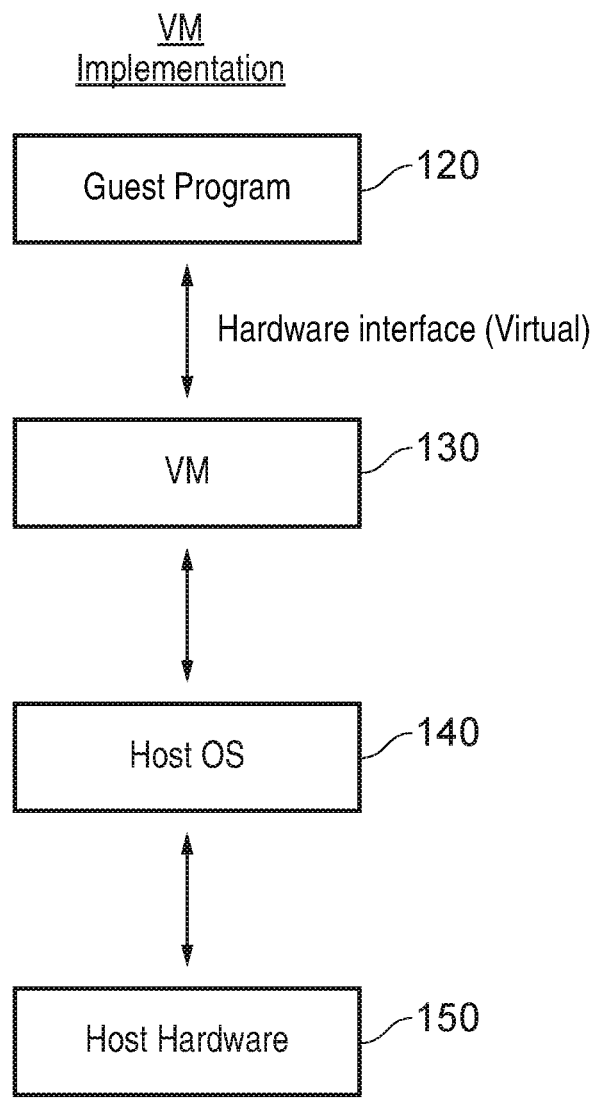
FIG. 19 illustrates a virtual machine implementation that may be used.

FIG. 19 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 150 running a host operating system 140 supporting a virtual machine program 130. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 130 provides a virtual hardware interface to an guest program 120 which is the same as the hardware interface which would be provided by the real hardware which is the device being modelled by the virtual machine program 130. Thus, the program instructions, including the control of memory accesses described above, may be executed from within the guest program 120 using the virtual machine program 130 to model their interaction with the virtual machine hardware. The guest program 120 may be a bare metal program, or alternatively it may be a guest operating system that runs applications in a similar way to how Host OS 140 runs the virtual machine application 130. It will also be appreciated that there are different types virtual machine, and in some types the virtual machine runs directly on the host hardware 150 without the need for a host OS 140.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   processing circuitry to perform data processing;
   a plurality of vector registers to store vector values comprising a plurality of data elements;
   a plurality of scalar registers to store scalar values; and
   an instruction decoder to decode a vector multiply-add instruction defined by an instruction set architecture, the vector multiply-add instruction specifying a plurality of registers including at least one vector register and at least one scalar register, to control the processing circuitry to perform a vector multiply-add operation comprising a plurality of lanes of processing on a first vector value stored in a first vector register specified by the vector multiply-add instruction to generate a result vector value comprising a plurality of result data elements;
   each lane of processing comprising generating a respective result data element of the result vector value corresponding to a sum or difference of a product value and an addend value, the product value corresponding to a product of a respective data element of the first vector value and a multiplier value;
   wherein for each lane of processing, at least one of the multiplier value and the addend value comprises at least a portion of a scalar value stored in a scalar register specified by the vector multiply-add instruction.

2. The apparatus according to claim 1, wherein for each lane of processing, one of the multiplier value and the addend value comprises said at least a portion of said scalar value, and the other of the multiplier value and the addend value comprises a respective data element of a second vector value stored in a second vector register specified by the vector multiply-add instruction.

3. The apparatus according to claim 2, wherein in response to a first variant of the vector multiply-add instruction, the instruction decoder is configured to control the processing circuitry to perform the vector multiply-add operation in which, for each lane of processing, the addend value comprises said at least a portion of said scalar value and the multiplier value comprises said respective data element of the second vector value.

4. The apparatus according to claim 2, wherein in response to a second variant of the vector multiply-add instruction, the instruction decoder is configured to control the processing circuitry to perform the vector multiply-add operation in which, for each lane of processing, the multiplier value comprises said at least a portion of said scalar value and the addend value comprises said respective data element of the second vector value.

5. The apparatus according to claim 1, wherein the processing circuitry is configured to mask an operation associated with a given portion of the result vector value in response to a predication indication identifying that said given portion is a portion to be masked.

6. The apparatus according to claim 5, wherein the predication indication for each portion of the result data element is one of:
   specified in a predicate register specified by the vector multiply-add instruction; and
   provided by predication circuitry or specified in a predicate register independent of an encoding of the vector multiply-add instruction.

7. The apparatus according to claim 1, wherein in response to a given vector instruction, the processing circuitry is configured to perform a plurality of beats of processing each corresponding to a section of a vector value; and
   the processing circuitry is configured to support overlapped execution of first and second vector instructions in which a first subset of beats of the second vector instruction is performed in parallel with a second subset of beats of the first vector instruction.

8. The apparatus according to claim 1, wherein in response to an add variant of the vector multiply-add instruction, the instruction decoder is configured to control the processing circuitry to perform the vector multiply-add operation where each lane of processing comprises generating the respective result data element corresponding to the sum of the addend value and the product value.

9. The apparatus according to claim 1, wherein in response to a subtract variant of the vector multiply-add instruction, the instruction decoder is configured to control the processing circuitry to perform the vector multiply-add operation where each lane of processing comprises generating the respective result data element corresponding to the difference of the addend value and the product value.

10. The apparatus according to claim 1, wherein in response to a saturating variant of the vector multiply-add instruction, the instruction decoder is configured to control the processing circuitry to clamp a given result data element of the result vector value to a minimum or maximum value of a predetermined range when a result of the corresponding lane of processing is outside the predetermined range.

11. The apparatus according to claim 1, wherein the first vector value comprises data elements having one of a plurality of data element sizes supported by the processing circuitry.

12. The apparatus according to claim 1, wherein when a data element size of the data elements of the first vector value is smaller than a width of the scalar register, the instruction decoder is configured to control the processing circuitry to perform the vector multiply-add operation with said at least one of the multiplier value and the addend value corresponding to a portion of the scalar value having a width corresponding to the data element size.

13. The apparatus according to claim 1, wherein in response to an integer or fixed-point variant of the vector multiply-add instruction, the instruction decoder is configured to control the processing circuitry to generate the respective result data elements of the result vector value using integer or fixed-point arithmetic.

14. The apparatus according to claim 13, wherein in response to an element-widening variant of the vector multiply-add instruction, the instruction decoder is configured to control the processing circuitry to perform the vector multiply-add operation on the first vector value comprising J-bit data elements to generate the result vector value comprising K-bit result data elements, where K>J.

15. The apparatus according to claim 13, wherein in response to an element-size-preserving variant of the vector multiply-add instruction, the instruction decoder is configured to control the processing circuitry to perform the vector multiply-add operation on the first vector value comprising J-bit data elements to generate the result vector value comprising J-bit result data elements.

16. The apparatus according to claim 15, wherein in response to the element-size-preserving variant of the vector multiply-add instruction, the instruction decoder is configured to control the processing circuitry to perform the vector multiply-add operation where for a given lane of processing, the respective result data element corresponds to one of:
- a least significant J bits of a value corresponding to said sum or difference of the product value and the addend value;
- a most significant J bits of said value corresponding to said sum or difference;
- a most significant J bits of said value corresponding to said sum or difference, rounded based on at least one less significant bit of said value corresponding to said sum or difference than said most significant J bits;
- bits [2J−1:J] of a 2J+1-bit value corresponding to said sum or difference of the product value and the addend value; and
- bits [2J−1:J] of said 2J+1-bit value, rounded based on at least one of bits [J−1:0] of said 2J+1-bit value.

17. The apparatus according to claim 1, wherein in response to a floating-point variant of the vector multiply-add instruction, the instruction decoder is configured to control the processing circuitry to perform the vector multiply-add operation to generate the respective result data elements of the result vector value using floating-point arithmetic.

18. The apparatus according to claim 17, wherein at least one of:
- in response to a split floating-point variant of the vector multiply-add instruction, the instruction decoder is configured to control the processing circuitry to perform the vector multiply-add operation in which each lane of processing comprises generating a rounded product of the respective data element of the first vector value and the multiplier value, and generating the respective result data element of the result vector value according to the sum or difference of the rounded product and the addend value; and
- in response to a fused floating-point variant of the vector multiply-add instruction, the instruction decoder is configured to control the processing circuitry to perform the vector multiply-add operation in which each lane of processing comprises generating an unrounded product of the respective data element of the first vector value and the multiplier value, and generating the respective result data element of the result vector value according to the sum or difference of the unrounded product and the addend value.

19. A data processing method comprising:
- decoding a vector multiply-add instruction defined by an instruction set architecture, the vector multiply-add instruction specifying a plurality of registers including at least one vector register and at least one scalar register; and
- in response to the vector multiply-add instruction, controlling processing circuitry to perform a vector multiply-add operation comprising a plurality of lanes of processing on a first vector value stored in a first vector register specified by the vector multiply-add instruction to generate a result vector value comprising a plurality of result data elements;
- each lane of processing comprising generating a respective result data element of the result vector value corresponding to a sum or difference of a product value and an addend value, the product value corresponding to a product of a respective data element of the first vector value and a multiplier value;
- wherein for each lane of processing, at least one of the multiplier value and the addend value comprises at least a portion of a scalar value stored in a scalar register specified by the vector multiply-add instruction.

20. A non-transitory computer-readable storage medium storing a virtual machine computer program comprising program instructions to control a host data processing apparatus to provide an instruction execution environment corresponding to the apparatus according to claim 1.

* * * * *